United States Patent [19]

Bednarski

[11] 4,275,019

[45] Jun. 23, 1981

[54] A MODULAR HEAPING-TYPE PACKING ELEMENT

[75] Inventor: Stanisław Bednarski, Cracow, Poland

[73] Assignee: Przedsiebiorstwo Wdrazania i Upowszechniania Postepu Technicznego i Organizacyjnego "Posteor", Poznan, Poland

[21] Appl. No.: 50,923

[22] Filed: Jun. 21, 1979

[51] Int. Cl.³ .................................................. B01F 3/04
[52] U.S. Cl. ............................ 261/98; 29/157.3 A; 29/453; 261/DIG. 72
[58] Field of Search ................ 261/DIG. 72, 98; 210/150; 29/453, 157.3 A

[56] References Cited

U.S. PATENT DOCUMENTS

| | | | |
|---|---|---|---|
| 598,351 | 2/1898 | Staub | 261/112 |
| 1,173,187 | 2/1916 | Hechenbleikner | 261/DIG. 72 |
| 1,365,671 | 1/1921 | Fairlie | 261/DIG. 72 |
| 1,947,777 | 2/1934 | Huff et al. | 261/112 |
| 2,911,204 | 11/1959 | Malone | 261/112 |
| 3,151,187 | 9/1964 | Comte | 261/DIG. 72 |
| 3,266,787 | 8/1966 | Eckert | |
| 3,430,934 | 3/1969 | Weishaupt | 261/112 |
| 3,704,869 | 12/1972 | Priestley | 261/112 |
| 4,072,736 | 2/1978 | Fattinger | 261/112 |
| 4,122,011 | 10/1978 | Strigle, Jr. | 261/112 |

FOREIGN PATENT DOCUMENTS

| | | |
|---|---|---|
| 853159 | 10/1952 | Fed. Rep. of Germany . |
| 542902 | 8/1922 | France . |
| 52-10104 | 3/1977 | Japan .................. 261/DIG. 72 |
| 55193 | 7/1968 | Poland . |
| 70169 | 4/1974 | Poland . |
| 598856 | 5/1978 | Switzerland ............ 261/DIG. 72 |
| 320293 | 1/1972 | U.S.S.R. . |

OTHER PUBLICATIONS

"Hy-Pak", Bulletin Hy-30, Norton Co., Akron, Ohio 44309, 8-77, 8 pp.

Primary Examiner—Tim R. Miles
Attorney, Agent, or Firm—Ladas & Parry

[57] ABSTRACT

A modular packing element of generally pismatic or rectangular shape having a continuous side wall formed of rolled sheet material having both surfaces formed with an array of elongated, thin protrusions in the form of needles, cones, spikes, or the like, of various lengths, extending both inwardly and outwardly.

5 Claims, 13 Drawing Figures

A MODULAR HEAPING-TYPE PACKING ELEMENT

The subject of the invention is modular heaping-type packing elements, especially of plastics and ceramic materials, designed for packing of columns for mass and heat exchange and for the separation of solid and liquid bodies from gases, as well as for carrying out of chemical reactions with and without a catalyst.

From the Polish Pat. No. 101,135, published Dec. 30, 1978, there is known a method for manufacturing of heaping-type packing elements of plastics and ceramic materials, which consists in an injection moulding of the packing elements of plastics in the form of rings. On the other hand a method for manufacturing of packing elements of ceramic materials consists in that first of all a tube is cut out which is then cut to a required length, and afterwards a successive forming device cuts out from the flank of the tube triangular or similar in shape sectors and bends them to the interior of the packing element. The known method for manufacturing of the packing elements requires the application of complicated moulds including numerous components cooperating with one another, which causes low efficiency and fast wear of the devices.

The object of the invention is heaping-type packing elements made in two working cycles which render it possible to use uncomplicated multi-segment moulds. The heaping-type packing element provides for possibilities of enlarging the exchange area in a unit of volume, and thus of obtaining higher separation efficiency of multi-component mixtures.

In manufacturing the heaping-type packing elements according to the invention a flank of a cylinder or a polygon is moulded with all segments connected, preferably perpendicular to the flank, and then, outside the die the flank is cold rolled in the form of a cylinder or an optional polygon preferably by means of rolls, and then the side edges of the flank are durably fastened together by means of welding, or are fastened separably by means of locks. Another method for manufacturing of the packing elements of plastics consists of molding in a die a flank of a cylinder or an optional polygon with all segments connected, preferably perpendicular to the flank, and then outside the die the flank is hot rolled in the form of a cylinder or an optional polygon by means of rolls or shafts, and afterwards the element thus formed is cooled fast in order to maintain the durable formed shape. For manufacturing of the heaping-type packing elements of ceramic materials an initially moulded band or a solid of an optional shape of a determined volume is delivered to a segment die, wherein in one cycle an outspread flank of a cylinder or of an optional polygon is formed with all segments connected, preferably perpendicular to the flank, and then the flank thus obtained in a flexible form is scrolled in the form of a cylinder or an optional polygon, preferably by means of rolls or shafts, and at the same time its side edges are fastened together, and afterwards the element is subjected to the known process of drying and burning.

The heaping-type packing element in the form of a cylinder or an optional polygon made of plastics according to the invention is essential in that its flank is openwork or full and is provided at one side with optionally moulded segments in the form of fins, spikes, needles, cones or any other optional segments, whereas the other side of the flank is plain or is provided with protrusions of optional shapes, in the form of fins, spikes, needles, cones and other optional shapes, arranged so that in the cross-section of the element in the form of a cylinder or an optional polygon they form a spatial figure, preferably similar to a cube. The side edges of the flank are provided with locks of optional shapes, in the form of pins for connecting them with holes, and moreover, at least one front edge of the flank is provided with thresholds for connecting of the elements in heaps. Additionally, the flank, the side edges and the front edges at least at one side are provided with grooves or protrusions parallel or crossing at an optional angle, which are designed for an intensification of mass and heat exchange.

Another heaping-type packing element in the form of a cylinder or an optional polygon made of ceramic material has its flank provided at one side with segments of an optional shape in the form of fins, spikes, needles, cones and or the like, whereas at the other side the flank is plain or provided with protrusions of an optional shape, arranged so that in the cross-section of the element in the form of a cylinder or an optional polygon they form a spatial figure preferably similar to a cube, as well as by that the side edges of the flank are flat or are provided with thresholds which at one side have, for example, holes and at the other side protrusions. Moreover, at least one front edge of the flank is provided with seats designed for arranging the packing elements in an assembly or in generally rectangularly shaped blocks. Additionally, the flank, the side edges, and the front edges are provided at least at one side with grooves or protrusions parallel or crossing at an optional angle, which are designed for an intensification of the process of mass and heat exchange.

The advantage of the packing elements according to the invention consists in highly effective and safe production, and the elements according to the invention are characterized by very high efficiency of mass and heat exchange, heretofore unobserved in the elements both Polish and foreign made.

EXAMPLE

A method for manufacturing of the heaping-type packing elements of plastics consists in that a die used for moulding of a packing element consists mainly of two basic parts, i.e. a base and a punch. The die is supplied with plastic under pressure, for instance polypropylene, and a flank of a cylinder or an optional polygon is moulded together with all segments belonging to it. After opening of the die, the moulded flank in the form of an outspread surface is removed from it and then is cold rolled or hot rolled in a device provided with appropriate rolls or shafts, whereas during cold rolling of the flank the side edges are then fastened durably by means of, for example, welding or sticking together, or are fastened separably by means of locks of an optional design, and during hot rolling of the flank it is subjected to a cooling process in order to maintain the shape of a cylinder or an optional polygon formed by means of rolls or shafts, the side edges not requiring fastening by means of welding or locks.

Another method for manufacturing of the heaping-type packing elements of a ceramic material, for instance of porcelain or stoneware, is characterized in that a band or a solid of a determined volume is moulded of a prepared ceramic material in a plastic form by the known method, and then it is delivered to a segment die consisting of a base and a punch. On an appropriate press the die is closed and a flank is moulded together with segments of an optional shape. After moulding of the flank in a flexible form and removing it from the die it is rolled in the form of a cylinder or an optional polygon in a roll- or a shaft-type device, and then its side edges are connected with each other by means of a butt joint or a lap joint. Then the packing elements of a ceramic material, thus made, are subjected to the known process of drying and burning.

BRIEF DESCRIPTION OF THE DRAWINGS

The heaping-type packing element according to the invention is presented in more detail on the basis of exemplary solutions shown in the drawings, wherein.

Figure 1:
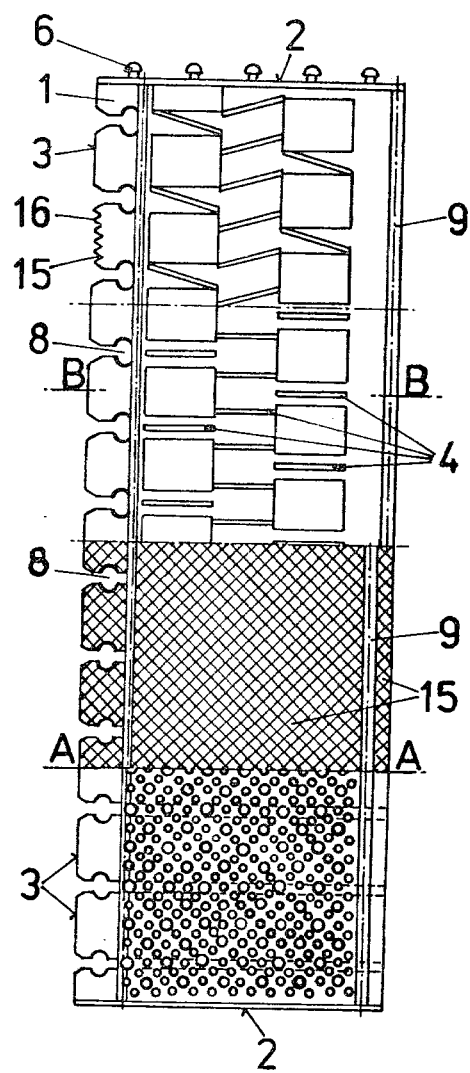
FIG. 1 shows the top view of the packing element of plastic.
Figure 2:
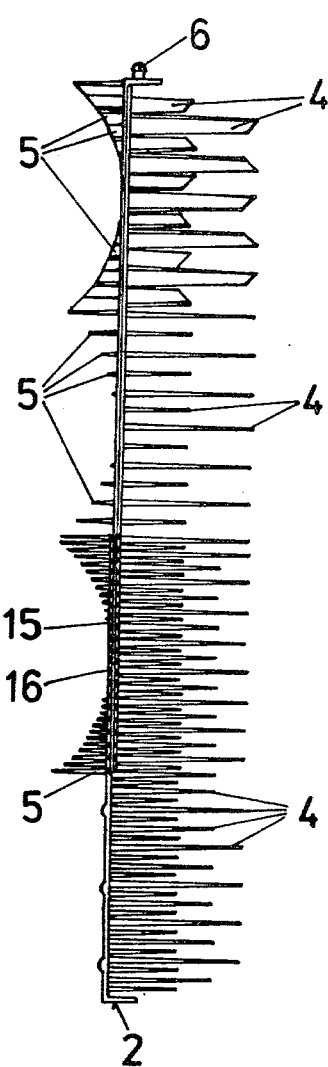
FIG. 2 shows the side view.
Figure 3:
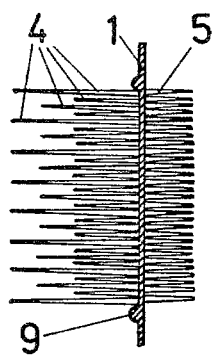
FIG. 3 shows the cross-section along the line A—A.
Figure 4:
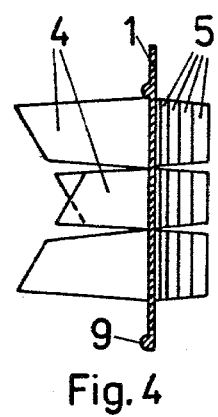
FIG. 4 shows also the cross-section of the outspread element along the line B—B.
Figure 5:
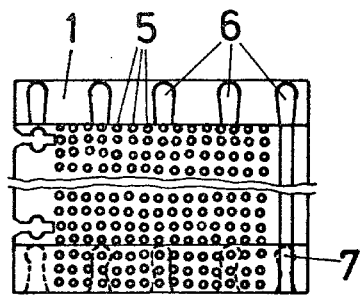
FIG. 5 shows the top view of the locks.
Figure 6:
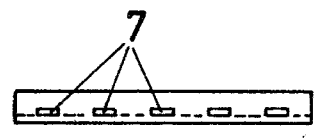
FIG. 6 shows the holes for the locks in the view of the side edge.
Figure 7:
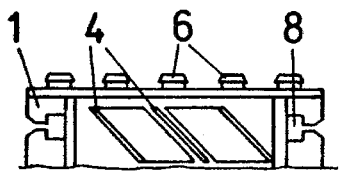
FIG. 7 shows the top view of another lock.
Figure 8:
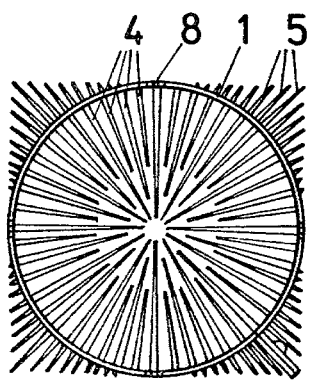
FIG. 8 shows the top view of the packing element after scrolling.

As it is shown in the drawings, the heaping-type packing element according to the invention made of plastic, for example of polypropylene, consists of an openwork or a full flank 1 enclosed by side edges 2 and front edges 3. The flank 1 is provided at one side with optionally shaped segments 4 in the form of fins, spikes, needles, cones or other, and at the other side it is plain or it is provided with protrusions 5 of an optional shape in the form of fins, spikes, needles, cones and other, arranged on the flank 1 so that in the cross-section of the packing element in the form of a cylinder or an optional polygon they form a spatial figure preferably similar to a cube. The side edges 2 are provided with locks 6 of an optional shape, in the form of pins fitting to the holes 7, clamping cones and other optional locks. At least from one side the front edges 3 are provided with seats 8 designed for arranging the packing elements in blocks by means of thresholds 9, said thresholds 9 being situated at the opposite front edge 3 in relation to the seats 8. Preferably the flank 1 and the edges 2 and 3, at least at one side, are provided with grooves 15 or protrusions 16 parallel or crossing at an optional angle, which serve for an intensification of mass and heat exchange.

Figure 9:
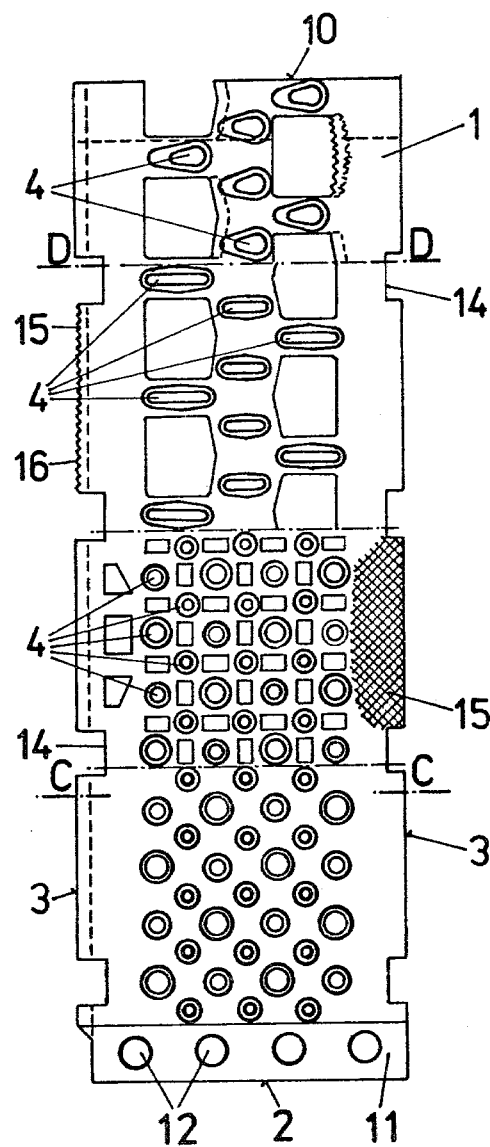
FIG. 9 shows the top view of another packing element made of plastic.
Figure 10:
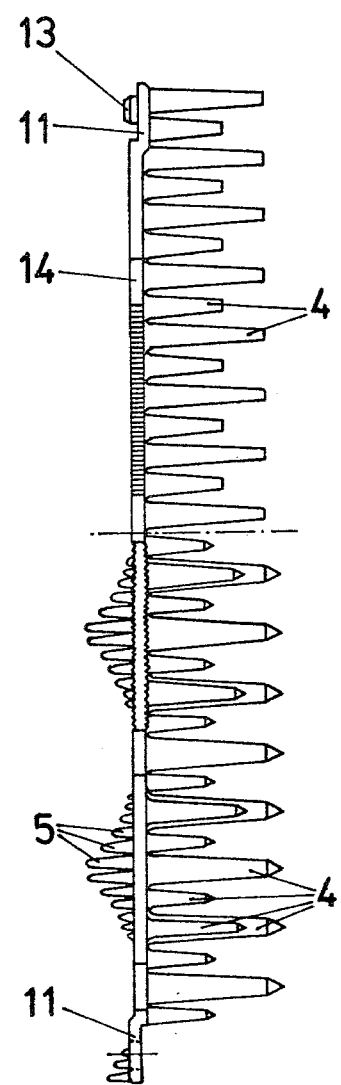
FIG. 10 shows its side view.
Figure 11:
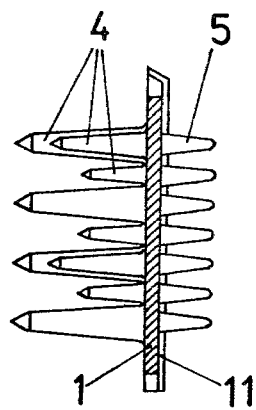
FIG. 11 shows its cross-section along the line C—C.
Figure 12:
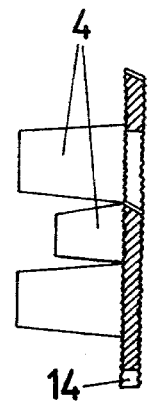
FIG. 12 shows its cross-section along the line D—D.
Figure 13:
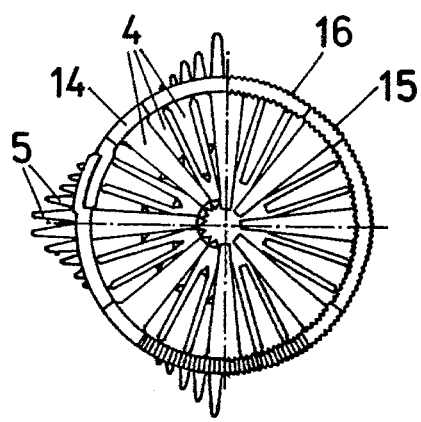
FIG. 13 shows the top view of the element after scrolling.

Another form of the packing element according to the invention, made of a ceramic material, as shown in FIG. 9, consists of an openwork or a full flank 1 enclosed by side edges 2 and front edges 3. The flank 1 is provided, at least at one side, with optionally shaped segments 4 in the form of fins, spikes, needles, cones and other, and at the other side the flank 1 is plain or provided with optionally shaped protrusions 5 arranged so that in the cross-section of the packing element in the form of a cylinder or a polygon they form a spatial figure preferably similar to a cube. The side edges 2 are provided with flat ends 10 or with thresholds 11 which have at one side, for example, holes 12 and at the other side they have protrusions 13. At least one front edge 3 is provided with seats 14 which serve for arranging the heaping-type packing elements in an assembly or in blocks. Preferably the flank 1 and the edges 2 and 3 are provided, at least at one side, with grooves 15 or protrusions 16 parallel or crossing at an optional angle, which serve for an intensification of the process of mass and heat exchange.

What is claimed is:

1. A modular packing element for mass and heat exchange, adapted for coupling into an assembly having a vertical axis and a generally prismatic or rectangular shape in cross-section with open bases, comprising a continuous side wall element formed of rolled sheet material having both surfaces formed with an array of elongated, thin protrusions in form of needles, cones, spikes, or the like, of various lengths, extending both inwardly and outwardly of the wall element and located radially uniformly around a central portion of the side wall, and located at generally equal distances from the longer edges of the sheet-like material.

2. The modular packing element according to claim 1, wherein the outer protrusions of the side wall are located in groups, with vertical axes of symmetry equally spaced one from another and from the edges of the wall material.

3. An assembly of elements according to claim 1, wherein the outer protrusions substantially fill the spaces located between the side wall of each adjacent element and the outer perimeter of the assembly.

4. The modular element according to claim 1, wherein the edge of the side wall around one base has raised portions and at the base edge a plurality of sockets for connecting with corresponding raised portions of other elements in order to form an interlocked assembly.

5. The modular element according to claim 1, wherein the side wall is formed into cylindrical shape, the inward protrusions substantially filling the inside thereof, and the outward protrusions forming a generally cubic outer profile for the element.

* * * * *